(12) United States Patent
Ijeri et al.

(10) Patent No.: US 11,214,693 B2
(45) Date of Patent: Jan. 4, 2022

(54) ELECTRICALLY CONDUCTIVE COATING COMPOSITIONS WITH CORROSION RESISTANCE

(71) Applicant: The Boeing Company, Chicago, IL (US)

(72) Inventors: Vijaykumar S. Ijeri, Mumbai (IN); Stephen P. Gaydos, St. Louis, MO (US); Patrick J. Kinlen, St. Louis, MO (US); Priyanka G. Dhirde, Maharashtra (IN); Anand Khanna, Mumbai (IN)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/537,126

(22) Filed: Aug. 9, 2019

(65) Prior Publication Data

US 2021/0040333 A1 Feb. 11, 2021

(51) Int. Cl.
| | |
|---|---|
| C09D 5/24 | (2006.01) |
| C09D 7/61 | (2018.01) |
| C09D 5/08 | (2006.01) |
| C09D 163/00 | (2006.01) |
| H01B 1/04 | (2006.01) |
| C08K 3/04 | (2006.01) |
| C01B 32/19 | (2017.01) |
| C08K 3/013 | (2018.01) |

(52) U.S. Cl.
CPC .............. *C09D 5/24* (2013.01); *C09D 5/08* (2013.01); *C09D 7/61* (2018.01); *C09D 163/00* (2013.01); *H01B 1/04* (2013.01); *C01B 32/19* (2017.08); *C08K 3/013* (2018.01); *C08K 3/042* (2017.05)

(58) Field of Classification Search
CPC .......... C09D 5/08; C09D 5/24; C09D 163/00; C08K 3/042; C08K 3/46; H01B 1/04
USPC ................... 252/500, 510, 51, 511
See application file for complete search history.

(56) References Cited

U.S. PATENT DOCUMENTS

| | | |
|---|---|---|
| 9,540,498 B1 | 1/2017 | Scheffer et al. |
| 2011/0049437 A1 | 3/2011 | Crain et al. |
| 2011/0086206 A1 | 4/2011 | Scheffer et al. |
| 2015/0240088 A1 | 8/2015 | Asay et al. |
| 2016/0024310 A1* | 1/2016 | McMullin ................ C09D 5/08 428/418 |
| 2016/0035456 A1 | 2/2016 | Sauro et al. |
| 2016/0053398 A1 | 2/2016 | Kurtz et al. |
| 2016/0312038 A1 | 10/2016 | Bohm et al. |
| 2017/0037257 A1 | 2/2017 | Yang et al. |
| 2017/0066928 A1* | 3/2017 | Camps ..................... C09D 1/00 |
| 2019/0148741 A1* | 5/2019 | Kucernak ........... H01M 8/0228 429/518 |
| 2019/0338146 A1* | 11/2019 | Meng ..................... C08G 18/10 |

FOREIGN PATENT DOCUMENTS

| | | | | |
|---|---|---|---|---|
| CN | 103628050 A | * | 3/2014 | ............. C23C 18/16 |
| GB | 256048 A | * | 6/2019 | ............... C08K 3/04 |
| WO | 2009/123771 A2 | | 10/2009 | |
| WO | 2015/090622 A1 | | 6/2015 | |
| WO | 2018/019905 A1 | | 2/2018 | |
| WO | 2019/020999 A1 | | 1/2019 | |
| WO | 2019/217402 A1 | | 11/2019 | |

OTHER PUBLICATIONS

Pourhashem "Excellent corrosion protection performance of epoxy composite coatings filled with amino-silane functionalized graphene oxide." Surface & Coatings Technology 317 (2017) 1-9 (Year: 2017).*
Aneja et al., "Eco-friendly synthesis of graphene using high pressure airless spray system," Proc of the 12th Pacific Rim Conference on Ceramic and Glass Technology: Ceramic Transactions, vol. 264, 2018, pp. 23-31.
Aneja et al., "Graphene based anticorrosive coatings for Cr(VI) replacement," The Royal Society of Chemistry, Nanoscale, 2015, 7, 17879-17888.
Extended European Search Report dated Jan. 27, 2021 in corresponding European Application No. 20189813.7, 6 pages.

* cited by examiner

*Primary Examiner* — Tri V Nguyen
(74) *Attorney, Agent, or Firm* — MH2 Technology Law Group LLP

(57) ABSTRACT

An electrically conductive and corrosion resistant graphene-based coating composition, including a binder, a graphene-filler; and a dispersing agent, wherein the graphene filler comprises a plurality of graphene stacks.

15 Claims, No Drawings

ELECTRICALLY CONDUCTIVE COATING COMPOSITIONS WITH CORROSION RESISTANCE

TECHNICAL FIELD

The present disclosure generally relates to electrically conductive coating compositions. And in particular, to electrically conductive graphene-based coating compositions.

BACKGROUND

Coating compositions can be applied to impart or enhance desired characteristics to a substrate. For example, electrically conductive coating compositions can be applied to conductive and/or non-conductive substrates to provide electromagnetic interference (EMI) shielding and electro static protection. Corrosion resistance coating compositions can be applied to metal substrates to provide long-lasting corrosion resistance. In fact, coating compositions can be optimized for a wide variety of applications, including wear resistance, ultraviolet (UV) radiation resistance, abrasion resistance, adhesion improvements, thermal conductivity, impact resistance, stiffness and strength improvements, etc.

Accordingly, there is a desire for coating compositions that can be applied to a variety of substrates to provide electrical conductivity and/or EMI protection while also providing good corrosion resistant, good adhesion or mechanical strength, and/or good wear protection.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure can be achieved by providing an electrically conductive and corrosion resistant graphene-based coating composition, including a binder; a graphene-filler; and a dispersing agent, wherein the graphene filler comprises a plurality of graphene stacks.

The plurality of graphene stacks can include high-pressure airless-spray partially exfoliated graphene stacks.

Each of the plurality of graphene stacks can have between 2 and 5 layers of graphene.

The graphene filler can consist essentially of high-pressure airless-spray partially exfoliated graphene stacks.

The graphene filler can consist essentially of a plurality of graphene stacks, each graphene stack having between 2 and 5 layers of graphene.

The graphene-based coating composition can include from about 1.0 weight % to about 30 weight % graphene filler, based on a total weight of the binder in the graphene-based coating composition.

The graphene-based coating composition can include from about 0.10 weight % to about 5.0 weight % dispersing agent.

The dispersing agent can include an alkylammonium salt of a high molecular-weight copolymer.

The graphene-based coating composition can include from about 50 weight % to about 99 weight % binder.

The binder can include a film forming resin.

The binder can include a polymeric binder.

The binder can include a silane-based binder.

The binder can include an epoxy-based binder.

The graphene-based coating composition can further include one or more electrically conductive components.

The one or more electrically conductive components can include carbon fibers.

The graphene-based coating composition can further include carbon fibers at a weight ratio of graphene-filler to carbon fibers in a range of about 0.1:10 to 1:5.

The graphene-based coating composition can further include at least one of a carrier, additional dispersion aids (including surfactants, emulsifiers, and wetting aids), surface treatment agents, adhesion promoters, thickening agents (including clays), defoamers, hardeners, wetting agents, cross-linking agents, curing agents, flow enhancers, viscosity agents, and stabilizers.

The graphene-based coating composition can have an electrical conductivity of at least 1 S/cm.

The graphene-based coating composition can have a pull-off adhesion of at least 2 MPa.

The graphene-based coating composition can extend corrosion protection to steel or aluminum alloys for more than 50 hours in a neutral salt spray test.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

Reference will now be made in detail to exemplary implementations of the present teachings, examples of which can be illustrated in any accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes implementations containing A, B, or C, multiple examples of A, B, or C, or combinations of A/B, A/C, B/C, A/B/B/B/B/C, AB/C, etc. In addition, throughout the specification, the meaning of "a," "an," and "the" include plural references. The meaning of "in" includes "in" and "on."

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

As used herein, the term "coating composition" refer to a composition in a form suitable for application to a substrate, as well as, the material of the composition after it is applied to the substrate, while it is being applied to the substrate, and both before and after any post-application treatments (such as curing, drying, heating, crosslinking, and the like).

The present disclosure describes graphene-based coating compositions and methods for their preparation and application. The graphene-based coating composition can be electrically conductive, and can be used on conductive substrates, such as metals or alloys, and non-conductive substrates, such as carbon fiber or thermoplastic composites and fiberglass.

The graphene-based coating composition can also provide anti-corrosion protection.

The graphene-based coating composition can also provide improved mechanical strength, such as improved adhesion, improved barrier protection, and/or improved wear resistance.

The graphene-based coating composition can include a graphene filler, a binder, and a dispersion agent.

Graphene generally refers to a one-atom-thick planar sheet of carbon atoms. The term comes from graphite+"-ene," as graphite itself consists of many graphene sheets stacked together. As used herein, the term "graphene stack" refers to a multi-layer stack of graphene sheets. That is, two or more graphene sheets.

The graphene-based coating composition can include from about 1.0 weight % to about 20 weight % graphene filler based on a total weight of the graphene-based coating composition. For example, the graphene-based coating composition can include from about 1.0 weight % to about 15 weight %, from about 1.0 weight % to about 10 weight %, and from about 1.0 weight % to about 5.0 weight %, graphene filler based on a total weight of the graphene-based coating composition. For example, the graphene-based coating composition can include from about 7.0 weight % to about 16 weight %, graphene filler based on a total weight of the graphene-based coating composition.

In other implementations, the amount of graphene filler can correspond to the amount of binder in the graphene-based coating composition. For example, the graphene-based coating composition can include from about 1.0 weight % to about 30 weight %, graphene filler based on a total weight of the binder in the graphene-based coating composition. In yet other implementations, the graphene-based coating composition can include from about 5.0 weight % to about 30 weight %, from about 5.0 weight % to about 20 weight %, or from about 5.0 weight % to about 10 weight %, graphene filler based on a total weight of the binder in the graphene-based coating composition. For example, the graphene-based coating composition can include from about 7.0 weight % to about 16 weight %, graphene filler based on a total weight of the binder in the graphene-based coating composition.

The graphene filler can include a plurality of graphene stacks. The graphene stacks can include a number of layers of graphene. For example, the graphene stacks can have between 2 and 5 layers of graphene. While not intending to be bound by any particular theory, the inventors believe that as the number of graphene layers in the graphene stack increases, it will tend to behave more like graphite. That it, it will have a reduced thermal and/or electrical conductivity. In addition, for a given weight of the graphene filler in the graphene-based coating composition, a higher number of layers in the graphene stacks may mean less coverage of graphene sheets over a substrate, and therefore less barrier (corrosion) protection.

In other implementations, the graphene stacks can have less than 5, less than 4, less than 3, and/or less than 2 layers of graphene. In other implementations, the graphene stacks can have between 1 and 2 layers of graphene, 1 and 3 layers of graphene, 1 and 4 layers of graphene, 1 and 5 layers of graphene, 2 and 3 layers of graphene, 2 and 4 layers of graphene, 3 and 4 layers of graphene, 3 and 5 layers of graphene, and/or 4 and 5 layers of graphene.

In some implementations, the graphene filler consists essentially of a plurality of graphene stacks. For example, the graphene filler can consist essentially of a plurality of graphene stacks having between 2 and 5 layers of graphene. The graphene filler can also consist essentially of a plurality of graphene stacks having between 1 and 2 layers of graphene, 1 and 3 layers of graphene, 1 and 4 layers of graphene, 1 and 5 layers of graphene, 2 and 3 layers of graphene, 2 and 4 layers of graphene, 3 and 4 layers of graphene, 3 and 5 layers of graphene, and/or 4 and 5 layers of graphene.

The graphene stacks with the desired number of graphene layers can be obtained by partially exfoliating graphite. For example, the graphene stacks can be obtained by high-pressure airless-spray exfoliation of graphite. In one implementation, the graphene stacks are obtained by spraying an intercalated graphite solution through an airless sprayer at high pressure. While not intending to be bound by any particular theory, the inventors believe that intercalation may increase the spacing between graphite layers, thus weakening the forces between the stacked graphite layers. Such expanded graphite solution, when sprayed at high pressure, forces individual graphene sheet to separate out. For example, in one implementation, a high quality graphite was intercalated with salt by soaking in a 1% salt solution for 15 days. The expanded graphite solution was then sprayed (Graco Magnum 262805 X7 HiBoy Cart Airless Paint Sprayer) into a container at high pressure ($1.7 \times 10^7$ Pa). In other implementations, other methods may be used to separate the graphene sheets, for example, ultrasonication, high-shear mixing, ball milling, etc. This spraying process was repeated three times. While not bound to any particular theory, the inventors believe that the nozzle of the spray gun creates a fan of the outgoing graphite solution thereby atomizing the graphite particles and forcing sheets of graphene to exfoliate. The sprayed solution was then subjected to bath sonication (30 min.) and centrifugation (10,000 rpm for 30 min) to further enhance de-stacking of the graphene sheets. In other implementations, the sprayed solution may be subjected to up to 2 hours of (indirect) bath sonication. The resulting supernatant was then separated and heated at 80° C. to obtain a concentrated solution of partially exfoliated graphene stacks in a water solution. In other implementations, the separated supernatant may be heated to about 70-90° C. to obtain the concentrated solution of partially exfoliated graphene stacks in a water solution. Accordingly, in one implementation, the graphene-based coating composition comprises a plurality of high-pressure airless-spray partially exfoliated graphene stacks.

The graphene-based composition includes a binder. The binder can be a film-forming resin. The binder can also be a polymeric binder, such as a silane-based binder or an epoxy-based binder. For example, the binder can include acrylic polymers, polyurethane polymers, polyether polymers, bisphenol A-based epoxy polymers, polysiloxane polymers, aqueous sol-gel based silane polymers, ethylene polymers, and copolymers and/or mixtures thereof. Such polymers can be solvent-borne, water-soluble or water-dispersible, emulsifiable, or of limited water solubility. The polymeric binders can be crosslinked or otherwise cured after the coating composition has been applied to the substrate.

The binder can be selected according to the type of substrate the coating composition will be applied to. For example, a silane-based binder can be used for substrates, such as glass or metals. Similarly, epoxy-based binders can be used for substrates such as metals or wood.

In some implementations, silane-based binders can be subject to hydrolysis to improve the binding to the substrate.

In one implementation, the binder is a water-borne silane-based binder with silane modified inorganic particles, such as Dynasylane Sivo 110 (an aqueous, non-alcoholic product of epoxysilane) available commercially from Evonik Industries GmbH, Germany. In another implementation, the binder is a medium viscosity epoxy resin based on Bisphenol A, such as Araldite GY 250 binder available commercially from Huntsman industries, The Woodlands Tex.

The graphene-based coating composition can include from about 50 weight % to about 99 weight % binder based on a total weight of the graphene-based coating composition. In other implementations, the graphene-based coating composition can include from about 60 weight % to about 95 weight %, from about 70 weight % to about 90 weight %, and from about 75 weight % to about 85 weight %, binder based on a total weight of the graphene-based coating composition.

The graphene-filler can be uniformly dispersed within the binder. The graphene-based composition can include a dispersing agent to enhance the dispersion of the graphene-filler within the binder.

The dispersing agent can be a solvent-based dispersing agent. In other implementations, the dispersing agent can be a water-based dispersing agent.

The dispersing agent can include amino, hydroxyl, and/or carboamide functional groups. The dispersing agent can include a high molecular weight copolymer. For example, the dispersing agent can be an alkylammonium salt of a high molecular-weight copolymer, such as BYK-9076, or a high molecular-weight copolymer having pigment-affinic groups, such as BYK-9077, both available commercially from BYK Industries GmbH, Germany.

The graphene-based coating composition can include from about 0.10 weight % to about 5.0 weight % dispersing agent based on a total weight of the graphene-based coating composition. In some implementations, the graphene-based coating composition can include less than 5.0 weight %, less than 4.0 weight %, less than 3.0 weight %, less than 2.0 weight %, and less than 1.0 weight % dispersing agent based on a total weight of the graphene-based coating composition. In other implementations, the graphene-based coating composition can include from about 0.10 weight % to about 4.0 weight %, from about 0.20 weight % to about 3.0 weight %, and from about 0.50 weight % to about 2.0 weight %, dispersing agent based on a total weight of the graphene-based coating composition.

In other implementations, the amount of dispersing agent can correspond to the amount of conductive pigments in the graphene-based coating composition (for example, the total amount of graphene filler and/or carbon fibers or other electrically conductive components). For example, the graphene-based coating composition can include from about 10 weight % to about 40 weight %, dispersing agent based on a total weight of the conductive pigments in the graphene-based coating composition. In yet other implementations, the graphene-based coating composition can include from about 20 weight % to about 40 weight %, from about 25 weight % to about 35 weight %, or about 30 weight %, dispersing agent based on a total weight of the conductive pigments in the graphene-based coating composition. For example, the graphene-based coating composition can include about 30 weight %, dispersing agent based on a total weight of the graphene filler and electrically conductive components in the graphene-based coating composition.

The graphene-based coating composition can also include additional ingredients according to specific desired characteristics, such as electrically conductive components (other than the graphene filler), a carrier (other than a binder), additional dispersion aids (including surfactants, emulsifiers, and wetting aids), surface treatment agents, adhesion promoters, thickening agents (including clays), defoamers, hardeners, wetting agents, cross-linking and curing agents, flow enhancers, viscosity agents, stabilizers, and the like.

The graphene-based coating composition can include electrically conductive components other than the graphene filler, such as metals, metal oxides, polymers, and carbonaceous materials. These electrically conductive components can take a variety of forms, including particles, powders, flakes, foils, fibers, etc. The electrically conductive components can be used to increase an electrical conductivity of the graphene-based coating composition.

The carbonaceous materials can include carbon black, graphite, carbon nanotubes, vapor-grown carbon nanofibers, carbon fibers, and metal coated carbon fibers.

The graphene-based coating composition can include from about 0.10 weight % to about 5.0 weight % electrically conductive components based on a total weight of the graphene-based coating composition. In some implementations, the graphene-based coating composition can include from about 0.10 weight % to about 4.0 weight %, from about 0.20 weight % to about 3.0 weight %, and from about 0.50 weight % to about 2.0 weight %, electrically conductive components based on a total weight of the graphene-based coating composition. For example, the graphene-based coating composition can include from about 0.10 weight % to about 5.0 weight % carbon fibers based on a total weight of the graphene-based coating composition.

In other implementations, the amount of electrically conductive components can be determined as a ratio. For example, the graphene-based coating composition can include carbon fibers at a weight ratio of graphene-filler to carbon fibers in a range of about 0.1:10 to 1:5.

The graphene-based coating composition can include from about 1.0 weight % to about 20 weight % of combined graphene filler and electrically conductive components based on a total weight of the graphene-based coating composition. In other implementations, the graphene-based coating composition can include from about 1.0 weight % to about 15 weight %, from about 1.0 weight % to about 10 weight %, and from about 1.0 weight % to about 5.0 weight %, combined graphene filler and electrically conductive components based on a total weight of the graphene-based coating composition.

The graphene-based coating composition can include a carrier other than the binder. The carrier can help dissolve, suspend, or otherwise disperse or carry the components of the graphene-based coating composition. The carrier can be selected according to the binder. For example, the carrier can be water when the graphene-based coating composition includes a water-based binder. The carrier can be an organic solvent when the graphene-based coating composition includes an epoxy-based binder.

The carrier can include water or an organic solvent. The organic solvent can be an aliphatic compound, an aromatic compound, mineral spirits, methyl ethyl ketone, n-butyl acetate, ethanol, isopropanol, t-butyl alcohol, and ethylene glycol, and mixtures thereof. The aliphatic compound can include hexanes, and the aromatic compound can be toluene or xylene. For example, the carrier can include surface treatment agents, hardeners, and/or surface wetting agents, among other things.

The graphene-based coating composition can include from about 10 weight % to about 50 weight % carrier based on a total weight of the graphene-based coating composition. In some implementations, the graphene-based coating composition can include from about 15 weight % to about 40 weight % or from about 25 weight % to about 35 weight %, carrier based on a total weight of the graphene-based coating composition. For example, the graphene-based coating composition can include about 30 weight % water.

As described above, the binder can include a film forming resin. Film forming resins can have functional groups that are reactive with either themselves or a crosslinking agent. Accordingly, in order to cure the film forming resin, in some implementations, the graphene-based coating composition includes a cross-linking agent.

The cross-linking agent can include aminoplasts, polyisocyanates including blocked isocyanates, polyepoxides, beta-hydroxyalkylamides, polyacids, anhydrides, organometallic acid-functional materials, polyamines, polyamides, and mixtures thereof. For example, the cross-linking agent can react with the hydroxyl groups of a silane polymer. In one implementation, the cross-linking agent includes hexamethoxymethyl melamine (HMMM), available commercially from Sigma-Aldrich. In other implementations, the graphene-based coating composition includes a catalyst for the reaction of the cross-linking agent. For example, the graphene-based coating composition can include dibutyltin dilaurate (DBTDL) as a catalyst for the reaction of HMMM and a silane polymer.

The graphene-based coating composition can include from about 0.01 weight % to about 2.0 weight % cross-linking agent based on a total weight of the graphene-based coating composition. In some implementations, the graphene-based coating composition can include from about 0.05 weight % to about 2.0 weight % or from about 0.1 weight % to about 1.0 weight % cross-linking agent based on a total weight of the graphene-based coating composition. For example, the graphene-based coating composition can include about 0.07 weight % HMMM. In other implementations, the graphene-based coating composition can include from about 0.01 weight % to about 0.2 weight % HMMM.

The graphene-based coating composition can include a surface treatment agent. In some implementations, the surface treatment agent lowers the curing temperature of a silane-based polymer. For example, in one implementation, the graphene-based coating composition includes a silane-based sol-gel system for the formulation of surface treatment systems, such as Dynasylane Sivo 160 available commercially from Evonik Industries GmbH, Germany.

The graphene-based coating composition can include a surface wetting agent. For example, in one implementation, the graphene-based coating composition includes a polyether modified silicone-based surface wetting agent, such as BYK-349, available commercially from BYK Industries GmbH, Germany. In one implementation, the amount of surface wetting agent corresponds to the total amount of graphene filler (or combined graphene filler and electrically conductive components) and binder in the graphene-based coating composition. For example, the graphene-based coating composition can include about 0.2 weight % BYK-349 based on a total amount of graphene filler and binder in the graphene-based composition.

The graphene-based coating composition can include additional catalysts or accelerator, such as hardeners, to promote fast curing and/or better cross-linking of the graphene-based coating composition. The hardener can be a polymeric hardener. For example, in one implementation, the graphene-based coating composition includes a polyethylene polyamine-based hardener.

The graphene-based coating composition can include a defoamer or antifoamer. For example, in one implementation, the graphene-based coating composition includes a polyether modified poly-dimethyl-siloxanes defoamer, such as BYK-333, available commercially from BYK Industries GmbH, Germany. In one implementation, the amount of defoamer corresponds to the total amount of binder in the graphene-based coating composition. For example, the graphene-based coating composition can include about 1.0 weight % BYK-333 based on a total amount of binder in the graphene-based composition.

The graphene-based coating compositions can be applied to a substrate using any suitable method, including, but not limited to, spray painting, spin casting, solution casting, printing (including ink jet printing), electrospray printing or painting, dip coating, and the like. In some implementations, the graphene-based coating compositions can be applied as multiple layers. In some implementations, the preferred method of application are dip coating, brush or spray application.

The thickness of the graphene-based coating composition can be measured in terms of dry film thickness. That is, a thickness of the coating after it has been applied and fully dried and/or cured. The dry film thickness of the graphene-based coating composition can range from about 0.5 microns to about 50 microns. For example, from about 1 to about 50 microns or from about 1 to about 15 microns. In one implementation, a preferred thickness would be from about 1 to about 35 microns.

EXAMPLES

Aspects of the present disclosure can be further understood by referring to the following examples. The examples are illustrative, and are not intended to be limiting.

Example 1

Table 1 illustrates various graphene-based coating compositions according to implementations of the present disclosure. In particular, Table 1 compares the electrical conductivity of the graphene-based coating compositions to a control (Control Comp. A). The coating compositions of Table 1 are silane-based coating compositions and were prepared as follows: 30 g of deionized water were added to 70 g of a silane-based binder (Dynasylane Sivo 110) and thoroughly mixed on a mechanical stirrer for 15 minutes at 1000 RPM and stabilized using 0.01M Acetic acid. Graphene filler and dispersing agent (BYK-9076) was then added to the compositions according to the amounts described in Table 1. The compositions were then thoroughly mixed on a mechanical stirrer for 24 hours at 1000 RPM. The coating compositions of Table 1 were then applied to glass slides and cured at 120° C. for 3 hours.

TABLE 1

| Composition | Binder | Carrier | Graphene Filler | Dispersing Agent | Electrical Conductivity (S/cm) |
|---|---|---|---|---|---|
| Control Comp. A | 70 g | 30 g | — | — | 0.52 |
| Composition #1 (3% graphene filler) | 70 g | 30 g | 2.1 g | 0.63 g | 4.52 |
| Composition #2 (5% graphene filler) | 70 g | 30 g | 3.5 g | 1.05 g | 6.25 |
| Composition #3 (7% graphene filler) | 70 g | 30 g | 4.9 g | 1.47 g | 6.75 |

The electrical conductivity was measured under a four point probe method using a Keithley Four Probe Instrument as follows: After the coating compositions were applied and cured on the glass slides, four probes were equidistantly placed in a straight line on each slide sample. The outer probes were used to pass a small amount of current and the inner probes were used to measure the change in voltage. The sheet resistance (Rs) of each coating composition was then measured in ohms per square (Ω/sq) per formula (1) below:

$$R_S = \frac{\pi}{\ln(2)} \frac{\Delta V}{I} = 4.53236 \frac{\Delta V}{I} \quad (1)$$

wherein $\Delta V$ is the voltage measured between the inner probes and I is the current applied between the outer probes. The factor of $\pi/\ln(2)$ is a geometric correction factor based upon the size and shape of the sample as well as the positioning of the probes.

The resistivity (ρ) of the coating was then calculated using formula for films (2) below:

$$\rho = R_S * t \quad (2)$$

wherein 't' is the thickness of the coating in cm.

The conductivity of the coating is the inverse of the resistivity and can be calculated using the following formula (3):

$$\text{Conductivity(S/cm)} = 1/\rho \quad (3)$$

As illustrated in Table 1, an electrical conductivity of the coating compositions increased as the amount of graphene filler increased. In particular, there is a very significant increase in the electrical conductivity of the coating compositions when compared to the control composition without the graphene filler (Control Comp. A).

A minimum electrical conductivity is required to provide electromagnetic interference (EMI) shielding to substrates coating with the graphene-based coating composition. In particular, at least 1 S/cm is required to provide adequate EMI shielding. Accordingly, the graphene-based coating composition has an electrical conductivity of at least 1 S/cm. For example, the graphene-based coating composition can have an electrical conductivity of at least 2 S/cm, 3 S/cm, 4 S/cm, 5 S/cm, or 6 S/cm.

Example 2

Table 2 illustrates a hydrolyzed graphene-based coating composition according to implementations of the present disclosure. Table 3 illustrates the electrical conductivity and physical characteristics of the hydrolyzed graphene-based coating composition of Table 2. The graphene-based coating composition of Table 2 was prepared as follows: 25 g of deionized water were added to 75 g of a surface treatment agent (Dynasylane Sivo 160) and stabilized using 0.01M Acetic acid to create carrier mixture A. 30 g of carrier mixture A was then added to 70 g of a silane-based binder (Dynasylane Sivo 110) to hydrolyze the silane-based binder. The composition was then thoroughly mixed on a mechanical stirrer for 6 hours at 1000 RPM to get a uniform composition. 3.5 g of graphene filler and 3.5 g of carbon fibers together with 2.1 grams of a dispersing agent (BYK-9076) were then added to the composition. The composition was then thoroughly mixed on a mechanical stirrer for 24 hours at 1000 RPM. Prior to applying the coating composition, 0.07 g of a cross-linking agent (HMMM stabilized with DBTDL) was added to the composition and mixed thoroughly for 30 minutes at 1000 rpm on a mechanical stirrer. The composition was then applied to an aluminum substrate and cured at 80° C. for about 6 to 8 hours. The aluminum substrate was pretreated by degreasing and etching with NaOH and desmutting with nitric acid. The composition was also applied to a glass slide and cured at 80° C. for 4-6 hours to measure electrical conductivity using the four point probe method described above.

TABLE 2

| Composition | Binder | Carrier | Graphene Filler/Carbon Fiber | Dispersing Agent |
|---|---|---|---|---|
| Comp. #4 (5% graphene filler/carbon fiber) | 70 g | 30 g | 3.5 g/3.5 g | 2.1 g |

Standard industry tests were then performed to the coating composition of Table 2. In particular, as illustrated in Table 3, the electrical conductivity, the pull-off adhesion, the cross hatch dry adhesion, the cross hatch wet adhesion, and anti-corrosion effects after exposure to a salt spray chamber were measure for Composition #4.

The pull-off adhesion was measured according to the ASTM International Standard D4541 "Standard Test Method for Pull-Off Strength of Coatings Using Portable Adhesion Testers," ASTM International, West Conshohocken, Pa., 2017. This test used a self-aligning adhesion tester type V (Test Method E). A higher pull of adhesion value indicates a better adhesion of the coating to a substrate.

The cross hatch dry adhesion and the cross hatch wet adhesion was measured according to ASTM International Standard D3359 "Standard Test Methods for Rating Adhesion by Tape Test," ASTM International, West Conshohocken, Pa., 2017. In particular, to test wet adhesion, coated specimens were placed in deionized (DI) water for 24 hours and then patted dry and immediately subjected to cross hatch adhesion as per ASTM D3359. On the coated samples a cross hatch pattern was marked post placing them in DI water for 24 hours.

The anti-corrosion effects after exposure to a salt spray was measured according to the ASTM International Standard B117 "Standard Practice for Operating Salt Spray (Fog) Apparatus," ASTM International, West Conshohocken, Pa., 2016. In particular, coating applied to the aluminum substrate were exposed to a 5% salt spray (fog). Coating compositions which showed no corrosion pits after the maximum period of exposure were considered to offer good corrosion resistance. The longer the maximum period without displaying corrosion pits, the better corrosion resistance a coating offers.

TABLE 3

| Electrical Conductivity | Pull-Off Adhesion (ASTM D4541) | Cross Hatch Dry Adhesion (ASTM D3359) | Cross Hatch Wet Adhesion (ASTM D3359) | Anti-Corrosion in Salt Spray (ASTM B117) |
|---|---|---|---|---|
| 12 S/cm | 2.6 MPa | Grade 5B | Grade 5B | 100 hours |

As illustrated in Table 3, Composition #4 displayed excellent electrical conductivity. In addition, the adhesion results indicate excellent mechanical strength. The salt spray test illustrates a significant corrosion resistivity for an electrically conductive coating composition.

The pull-off adhesion measurement relates to the ease with which a coating may come off a substrate. A pull-off adhesion measurement below 2 MPA may indicate that a coating may come off a substrate too easily. Accordingly, the graphene-based coating composition has a pull-off adhesion of at least 2 MPa. For example, the graphene-based coating composition can have a pull-off adhesion of at least 3 MPa, at least 4 MPa, and at least 5 MPa.

Example 3

Table 4 illustrates graphene-based coating compositions according to implementations of the present disclosure. In particular, Table 4 compares the electrical conductivity and other physical characteristics of various graphene-based coating compositions to a control. The coating compositions of Table 4 are epoxy-based coating compositions, and were prepared as follows: the Table 4 amounts of graphene filler was added to 75 g of an epoxy-based binder (Araldite GY 250) and thoroughly mixed on a mechanical stirrer for 15 minutes at 1000 RPM to obtain a uniform mixture. The Table 4 amounts of a dispersing agent (BYK-9076) together with 0.155 g of a surface wetting agent (BYK-349) and 0.75 g of a defoamer (BYK-333) were then added to the mixture under stirring and the mixture was then thoroughly mixed on a mechanical stirrer for 24 hours at 1000 RPM to ensure proper dispersion of the graphene filler and the formation of a smooth coating composition. The coating compositions of Table 4 where then cured with a polyethylene polyamine based hardener, at a base to hardener mixing ratio of 3:1 by volume, and the application consistency of the coating composition was adjusted with measured quantities of mixed solvents (xylene). The coating compositions of Table 4 where then applied to glass slides and aluminum substrates (without any pretreatment) and cured at room temperature for 24 hrs.

TABLE 4

| Composition | Binder | Hardener | Graphene Filler | Dispersing Agent | Electrical Conductivity (S/cm) |
|---|---|---|---|---|---|
| Control Comp. B | 75 g | 25 g | — | — | — |
| Composition #5 (3% graphene filler) | 75 g | 25 g | 2.25 g | 0.68 g | 2.38 |
| Composition #6 (5% graphene filler) | 75 g | 25 g | 3.75 g | 1.13 g | 3.13 |
| Composition #7 (7% graphene filler) | 75 g | 25 g | 5.25 g | 1.58 g | 4.76 |
| Composition #8 (9% graphene filler) | 75 g | 25 g | 6.75 g | 2.03 g | 5.2 |

The electrical conductivity was measured under the four points probe method described above. As illustrated in Table 4, an electrical conductivity of the coating compositions increased as the amount of graphene filler was increased. In particular, there is a very significant increase in the electrical conductivity of the coating compositions when compared to the control composition without the graphene filler (Control Comp. B).

Standard industry tests were then performed to the coating compositions of Table 4. In particular, as illustrated in Table 5, the corrosion resistance for the compositions of Table 4 was measured. As illustrated in Table 6, the pull-off adhesion, the tensile strength, elongation, and Taber abrasion was also measured for the compositions of Table 4.

The corrosion resistance illustrated in Table 5 was measured by electrochemical techniques using a CH-Instruments Potentiostat 1100C. The Coating compositions of Table 4 were applied on Al alloy panels and subjected to the electrochemical testing. In particular, the corrosion potential was measured. Corrosion potential can be a good measure of corrosion susceptibility of a coating. The higher (more positive) the corrosion potential is the better the corrosion inhibiting nature of the coating. The lower the corrosion current, the better the corrosion inhibiting nature of the coating. As illustrated in Table 5, as the graphene-filler content increases, the corrosion potential increases and the corrosion current decreases. This indicates a good corrosion inhibiting nature for the coatings of Table 5.

The pull-off adhesion was measured as described above and according to the ASTM International Standard D4541 "Standard Test Method for Pull-Off Strength of Coatings Using Portable Adhesion Testers," ASTM International, West Conshohocken, Pa., 2017.

The tensile strength and elongation was measured as described above and according to the ASTM International Standard D638 "Standard Test Method for Tensile Properties of Plastics," ASTM International, West Conshohocken, Pa., 2014.

The Taber-abrasion was measured according to the ASTM International Standard D4060 "Standard Test Method for Abrasion Resistance of Organic Coatings by the Taber Abraser," ASTM International, West Conshohocken, Pa., 2014.

TABLE 5

| Composition | Corrosion Potential vs SCE (V) | Log (Corrosion Current) (mA · cm$^2$) | Corrosion Current (mA · cm$^2$) | Corrosion Rate (mm/yr) |
|---|---|---|---|---|
| Control Comp. B | −0.664 | −3.95 | 1.122E−04 | 1.302E−03 |
| Composition #5 | −0.547 | −4.58 | 2.630E−05 | 3.051E−04 |
| Composition #6 | −0.532 | −5.48 | 3.311E−06 | 3.841E−05 |
| Composition #7 | −0.508 | −6.18 | 6.607E−07 | 7.664E−06 |
| Composition #8 | −0.328 | −6.48 | 3.311E−07 | 3.841E−06 |

As illustrated in Table 5, when compared to a control, the compositions of Table 4 displayed a higher corrosion potential, corresponding to a lower thermodynamic susceptibility of the coating to corrosion. In addition, the lower corrosion current indicates a better corrosion inhibiting nature of the coating composition of Table 4 versus a control.

TABLE 6

| Composition | Pull-Off Adhesion (ASTM D4541) | Tensile Strength (ASTM D638) | Elongation (ASTM D638) | Taber Abrasion (% wt. loss) (ASTM D4060) |
|---|---|---|---|---|
| Control Comp. B | 2.6 MPa | 0.4091 MPa | 14.48% | 4.8% |
| Composition #5 | 3.9 MPa | — | — | — |
| Composition #6 | 4.8 MPa | — | — | — |
| Composition #7 | 5.6 MPa | 1.073 MPa | 28.25% | 2.8% |
| Composition #8 | 5.2 MPa | — | — | — |

As illustrated in Table 6, the coating compositions of Table 6 displayed desirable physical properties while both displaying good electrical conductivity (Table 4) and good corrosion resistance (Table 5).

The present disclosure has been described with reference to exemplary implementations. Although a few implementations have been shown and described, it will be appreciated by those skilled in the art that changes can be made in these implementations without departing from the principles and spirit of preceding detailed description. It is intended that the present disclosure be construed as including all such modifications and alterations insofar as they come within the scope of the appended claims or the equivalents thereof.

What is claimed is:

1. An electrically conductive and corrosion resistant graphene-based coating composition, comprising:
   from about 50 weight % to about 99 weight % of a binder consisting essentially of a silane-based binder;
   a graphene filler; and
   a dispersing agent,
   wherein the graphene filler comprises a plurality of high-pressure airless-sprayed expanded graphene stacks,
   wherein the graphene-based coating composition has an electrical conductivity of at least 1 S/cm, and
   wherein the graphene-based coating composition has a pull-off adhesion of at least 2 MPa.

2. The graphene-based coating composition of claim 1, wherein the plurality of high-pressure airless-sprayed expanded graphene stacks are at least partially exfoliated, and
   wherein the graphene-based coating composition has an electrical conductivity of at least 2 S/cm.

3. The graphene-based coating composition of claim 1, wherein each of the plurality of high-pressure airless-sprayed expanded graphene stacks has between 2 and 5 layers of graphene.

4. The graphene-based coating composition of claim 1, wherein the graphene filler consists essentially of high-pressure airless-sprayed expanded graphene stacks.

5. The graphene-based coating composition of claim 1, wherein the graphene filler consists essentially of a plurality of high-pressure airless-sprayed expanded graphene stacks, each high-pressure airless-sprayed expanded graphene stack having between 2 and 5 layers of graphene.

6. The graphene-based coating composition of claim 1, comprising from about 1.0 weight % to about 30 weight % graphene filler, based on a total weight of the binder in the graphene-based coating composition.

7. The graphene-based coating composition of claim 6, further comprising one or more electrically conductive components.

8. The graphene-based coating composition of claim 7, wherein the one or more electrically conductive components comprise carbon fibers.

9. The graphene-based coating composition of claim 8, further comprising carbon fibers at a weight ratio of graphene-filler to carbon fibers in a range of about 0.1:10 to 1:5.

10. The graphene-based coating composition of claim 1, comprising from about 0.10 weight % to about 5.0 weight % dispersing agent.

11. The graphene-based coating composition of claim 10, wherein the dispersing agent comprises an alkylammonium salt of a high molecular-weight copolymer.

12. The graphene-based coating composition of claim 1, further comprising at least one of a carrier, additional dispersion aids, surface treatment agents, adhesion promoters, thickening agents, defoamers, hardeners, wetting agents, cross-linking agents, curing agents, flow enhancers, viscosity agents, and stabilizers.

13. The graphene-based coating composition of claim 1, wherein the graphene-based coating composition has an electrical conductivity of at least 5 S/cm.

14. The graphene-based coating composition of claim 1, wherein the graphene-based coating composition has a pull-off adhesion of at least 5 MPa.

15. The graphene-based coating composition of claim 1, wherein the graphene-based coating composition that extends corrosion protection to steel or aluminum alloys for more than 50 hours in a neutral salt spray test.

* * * * *